Patented Oct. 24, 1950

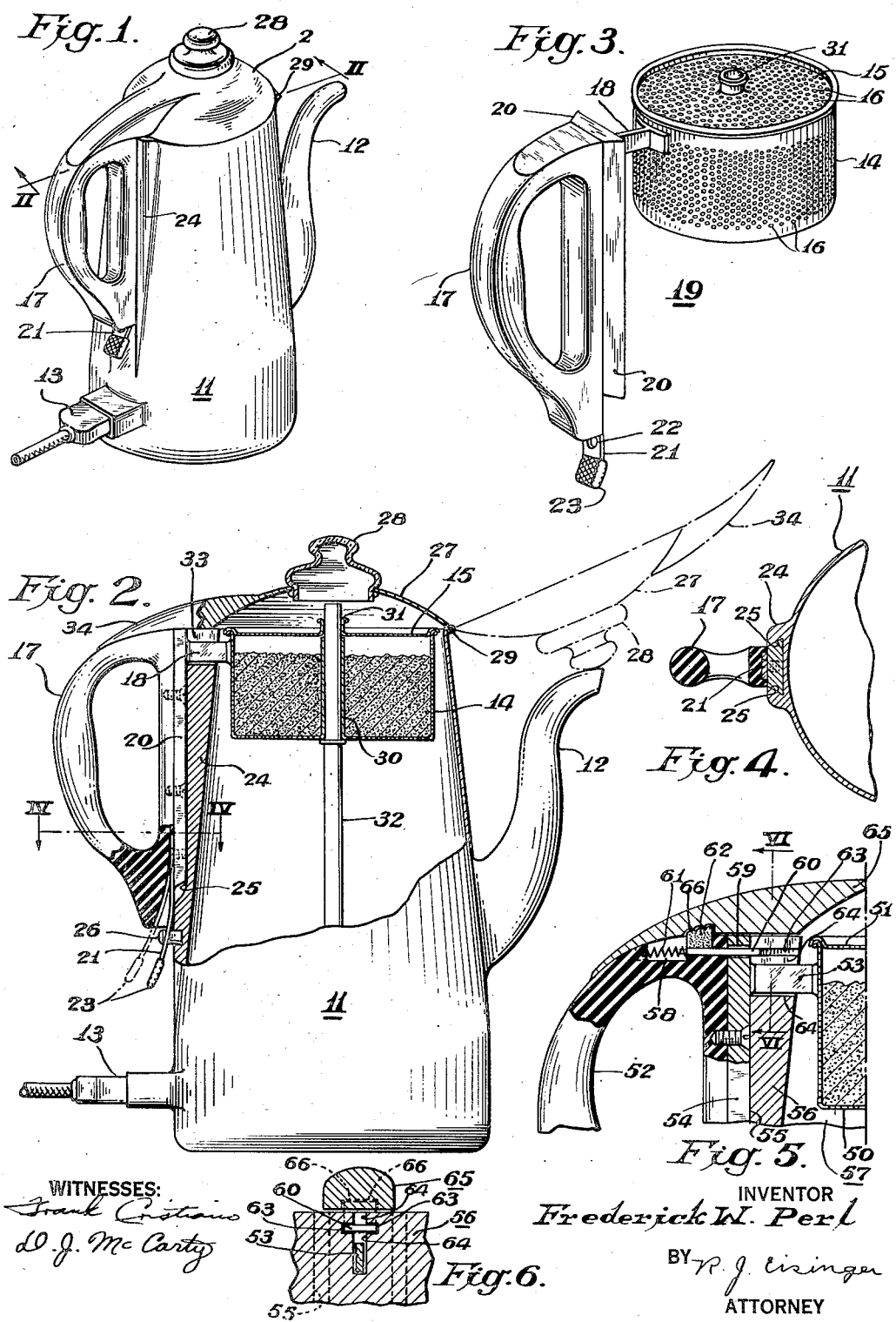

2,527,447

UNITED STATES PATENT OFFICE 2,527,447

LIQUID INFUSION DEVICE

Frederick W. Perl, Mansfield, Ohio, assignor to Westinghouse Electric Corporation, East Pittsburgh, Pa., a corporation of Pennsylvania Application September 26, 1947, Serial No. 776,360

6 Claims. (Cl. 99—310)

This invention relates to vessels used for the infusion of hot beverages and more particularly to vessels used for the infusion of coffee, usually termed coffee pots or coffee makers.

The removal of the infusion chamber from a coffee maker for cleaning purposes is a disliked chore and is often a hazardous one. It may be hot enough to scald the hands if not handled with care.

Accordingly, it is an object of this invention to provide a coffee maker in which the infusion chamber is provided with a handle for facilitating the removal of the chamber from the coffee maker.

A further object of this invention is to provide a coffee maker in which the infusion chamber is provided with a handle, and to arrange the handle in such a manner that it also serves as the coffee maker handle when in normal use.

A still further object of this invention is to provide a coffee maker having a cover which overlies the handle in such a manner that when the handle is gripped normally for pouring, the overlying portion of the cover is held, preventing the cover from swinging open.

While this invention may be used in any type of beverage infusion vessel, I have preferred to embody it, for the purpose of illustration, in a coffee percolator.

Other objects of this invention will either be pointed out specifically in the course of the following description of a device embodying my invention or will be apparent from such description.

In the accompanying drawing,

Figure 1 is a perspective view of an electric coffee percolator;

Figure 2 is a side elevation of the coffee percolator with some parts in section;

Figure 3 is a perspective view of the infusion chamber and handle assembly removed from the coffee percolator;

Figure 4 is a sectional view taken on line IV—IV of Figure 2.

Figure 5 is a fragmentary sectional view showing a modified form of my invention; and Figure 6 is a fragmentary sectional view taken on line VI—VI of Figure 5.

In the drawing, Figure 1 shows a coffee percolator having a container body 11, which has a conventional pouring spout 12. An electrical cord and plug attachment 13 of any well-known construction is brought into the body 11 for energizing electrical heating apparatus which is not shown, since it forms no part of the present invention and may be of any desired type as well understood in the art.

Within the container body 11 is disposed an infusion chamber 14 as shown in Figures 2 and 3. This chamber is of conventional cylindrical shape, having a cover plate 15, and is provided with the usual openings 16 to permit the water to filter through the ground coffee and the infused coffee to drain back into the container body in a well-known manner. The infusion chamber is fastened to a handle 17 by means of a cantilever support bar 18 thus forming a unitary assembly 19. The handle may be constructed of any heat-insulating material and has a preferably metallic vertical dovetail member 20 which may be attached to it by any suitable means. A flat spring latch member 21, having an opening 22 therein and a heat-insulating knob 23, has one end anchored between the lower portion of the handle 17 and the dovetail member 20.

Referring to Figures 2 and 4, the container body 11 has a vertical rib 24 disposed diametrically opposite the spout 12, although it may be disposed at any point remote from the spout. A dovetail groove 25 is formed within this rib longitudinally thereof for receiving the dovetail member 20. Adjacent the lower portion of the groove is disposed a pin 26 firmly held in the container body 11.

A cover 27, having the usual liquid spreader 28, is pivotally connected at 29 to the container body.

When the coffee maker is to be prepared for use, the cover 27 is swung open as indicated by the dot and dash lines and the container is filled with water to the desired level. The infusion chamber is then filled with ground coffee sufficient to prepare a proper infusion, and the chamber is then covered with its cover plate 15 to prevent grounds entering the water. The infusion chamber assembly 19 is then positioned in the container body 11 by entering the dovetail member 20 in the dovetail groove 25. It will be noted that the infusion chamber has a vertically-disposed imperforate tubular guide 30, centrally located therein, which is adapted to register with a central opening 31 in the chamber cover plate 15. This tubular guide and cover plate opening register with each other and fit over a conventional syphon tube 32 which is centrally located in the container body 11. A slot 33 is provided in the rib 24 to accommodate the infusion chamber support bar 18. As the handle 17 nears the end of its downward travel, the spring latch member 21 engages the dowel pin 26 and effects a locking engagement with the latch opening 22. The handle is thus detachably secured to the coffee percolator. The cover 27 is then swung into its closed position and the coffee beverage prepared in the usual manner. The handle may now be used for carrying the coffee percolator in the conventional manner.

As shown in Figures 1 and 2, the cover has a rear elongated portion 34 which overlies the handle 17 and blends therewith to provide a smooth contour. When pouring, this overlying portion is grasped as the handle is gripped, and allows the pouring to be accomplished without the usual tendency of the cover to fall off or swing open.

To remove the used coffee grounds the above sequence of operations is reversed. Briefly, the cover is swung open till it rests on the pouring spout and the handle latch is disengaged by lifting the spring latch knob. The infusion chamber and handle assembly is thus freed and may be lifted out. The dovetail sliding connection serves to direct the disassembly of the parts, so that no maneuvering is necessary to effect disengagement. The syphon tube remains in the container body and need not be removed except for general cleaning of the coffee maker. The infusion chamber and handle assembly may be carried conveniently and comfortably and its contents removed by removing the cover plate, turning the chamber assembly upside down and tapping the edge thereof against the surface of a receiving receptacle.

Referring to Figures 5 and 6, a second embodiment is shown in which a different type of latch is used. In this construction, the handle is latched to the container body at the top. This arrangement is quite similar to Figure 2 and has a perforated infusion chamber 50 provided with a perforated cover 51. The infusion chamber is attached to a handle 52 by means of a support bar 53. A dovetail member 54 is carried by the handle to provide a sliding connection with a dovetail groove 55 formed in a vertically disposed rib 56 of a container body 57. The handle 52 has a recess 58 in its upper surface which communicates with a slotted opening 59 at one side. Within the opening 59 is arranged a sliding latch bolt 60 which is biased to the right by a spring 61. To facilitate moving the latch bolt 60 against the bias of the spring, a knob 62 is provided which is rigidly fastened to the bolt. This knob may be of any heat-insulating material. A pair of slots 63 are formed in the side walls of an opening 64 in such a manner as to align with and receive the latch bolt 60.

The container body 57 has a cover 65 which overlies the handle 52 and conceals the latch knob 62. Since the latch knob extends above the handle contour, a recess 66 is formed in the cover 65 to permit seating of the cover on the handle.

To remove the infusion chamber 50 from the container 57, the cover 65 is swung open in a clockwise direction, the handle 52 is gripped normally and the latch knob 62 is moved to the left with the thumb. The latch bolt 60 is thus disengaged from its retaining slots 63 allowing the dovetail member 54 to be slid out of engagement with its mating dovetail groove 55. The infusion chamber is thus freed of the container and may be emptied as previously described. To reassemble, the above sequence of operations is simply reversed. In this embodiment, the operation of the latch and the removal of the infusion chamber may be accomplished with one hand. Also, the latch is hidden from view when the cover is in its normal closed position preventing any inadvertent movement of the latch. Since the cover is recessed to receive the upper portion of the latch knob, positive latching is insured. Unless the latch bolt is engaged properly, the cover is prevented from seating by the latch knob.

While I have shown my invention in several forms, it will be obvious to those skilled in the art that it is not so limited, but is susceptible of various other changes and modifications without departing from the spirit thereof.

What I claim is:

1. A beverage infusion vessel comprising a liquid container, an infusion chamber disposed within said liquid container, said container having a cover and together therewith completely enclosing said infusion chamber, a handle fixedly attached to said infusion chamber for removing said chamber from said liquid container, and attachment means for removably attaching said handle to said liquid container, said handle serving as a serving and carrying handle for the vessel.

2. The structure recited in claim 1 in which said attachment means comprises a sliding connection between said handle and said container and a latch for holding the sliding parts of said connection in assembled relation.

3. A beverage infusion vessel comprising a liquid container having a pouring spout, a cover pivotally attached to said container, an infusion chamber and a handle, said chamber being contained within said liquid container and said handle being attached to said chamber, and attaching means adapted to removably attach said handle to said container at a point remote from said cover pivotal connection, said cover having a portion overlying said handle and adapted to be gripped when said vessel is in a pouring position thereby preventing said cover from swinging open.

4. The structure recited in claim 3 in which said attaching means includes a sliding connection between said handle and said container and a latch for holding the sliding parts of said connection in assembled relation.

5. A beverage infusion vessel comprising a liquid container having a pouring spout, an infusion chamber disposed within said liquid container, a handle attached to said infusion chamber for removing said chamber from said liquid container, and attachment means for removably attaching said handle to said liquid container, said handle protruding exteriorly of said liquid container at a point remote from said spout and being disposed in a vertical plane to provide a serving and carrying handle for the vessel.

6. The structure recited in claim 5 in which said attachment means comprises a sliding connection between said handle and said container and a latch for holding the sliding parts of said connection in assembled relation.

FREDERICK W. PERL.

REFERENCES CITED

The following references are of record in the file of this patent:

UNITED STATES PATENTS

| Number | Name | Date |
| --- | --- | --- |
| 129,882 | Behringer | July 30, 1872 |
| 845,968 | Murray | Mar 5, 1907 |
| 1,036,767 | Wojidkow | Aug. 27, 1912 |
| 1,158,421 | Abtmeyer | Nov. 2, 1915 |
| 2,192,095 | Myers | Feb. 27, 1940 |
| 2,268,633 | Aske | Jan. 6, 1942 |
| 2,287,582 | Weeks | June 23, 1942 |

FOREIGN PATENTS

| Number | Country | Date |
| --- | --- | --- |
| 252,483 | Italy | Mar. 21, 1927 |